United States Patent [19]
Takahara et al.

[11] Patent Number: 5,329,509
[45] Date of Patent: Jul. 12, 1994

[54] OPTICAL DISK UNIT

[75] Inventors: Tamane Takahara, Tokyo; Hideaki Osawa; Naobumi Seo, both of Yokohama, all of Japan

[73] Assignee: Kabushiki Kaisha Toshiba, Kawasaki, Japan

[21] Appl. No.: 915,495

[22] Filed: Jul. 17, 1992

Related U.S. Application Data

[62] Division of Ser. No. 504,182, Apr. 4, 1990, Pat. No. 5,157,645.

[30] Foreign Application Priority Data

| Apr. 6, 1989 | [JP] | Japan | 1-85849 |
| Apr. 28, 1989 | [JP] | Japan | 1-111619 |
| Aug. 28, 1989 | [JP] | Japan | 1-218515 |
| Dec. 21, 1989 | [JP] | Japan | 1-329713 |

[51] Int. Cl.$^5$ ............................................ C11B 7/085
[52] U.S. Cl. ............................ 369/44.26; 369/44.28; 369/32; 369/58
[58] Field of Search ............... 369/44.28, 44.27, 44.29, 369/44.23, 44.34, 44.35, 44.41, 44.13, 32, 43, 58, 59, 44.26, 275.3, 275.4

[56] References Cited

U.S. PATENT DOCUMENTS

| 4,866,687 | 9/1989 | Kasai et al. | 360/78.05 |
| 5,063,546 | 11/1991 | Ito et al. | 369/44.26 |

Primary Examiner—Aristotelis Psitos
Assistant Examiner—Muhammad Edun
Attorney, Agent, or Firm—Foley & Lardner

[57] ABSTRACT

An optical disk unit having a light spot incident upon an optical disk. The light spot is radially moved to cross tracks formed on the optical disk. The tracks are provided with specific access marks. The number of access marks passed by the light spot as well as the number of tracks crossed by the light spot until a change is found in a detected access mark are counted. The latter number is divided by the former number and multiplied by a coefficient to provide a speed signal indicative of a speed of the light spot relative to the optical disk.

8 Claims, 14 Drawing Sheets

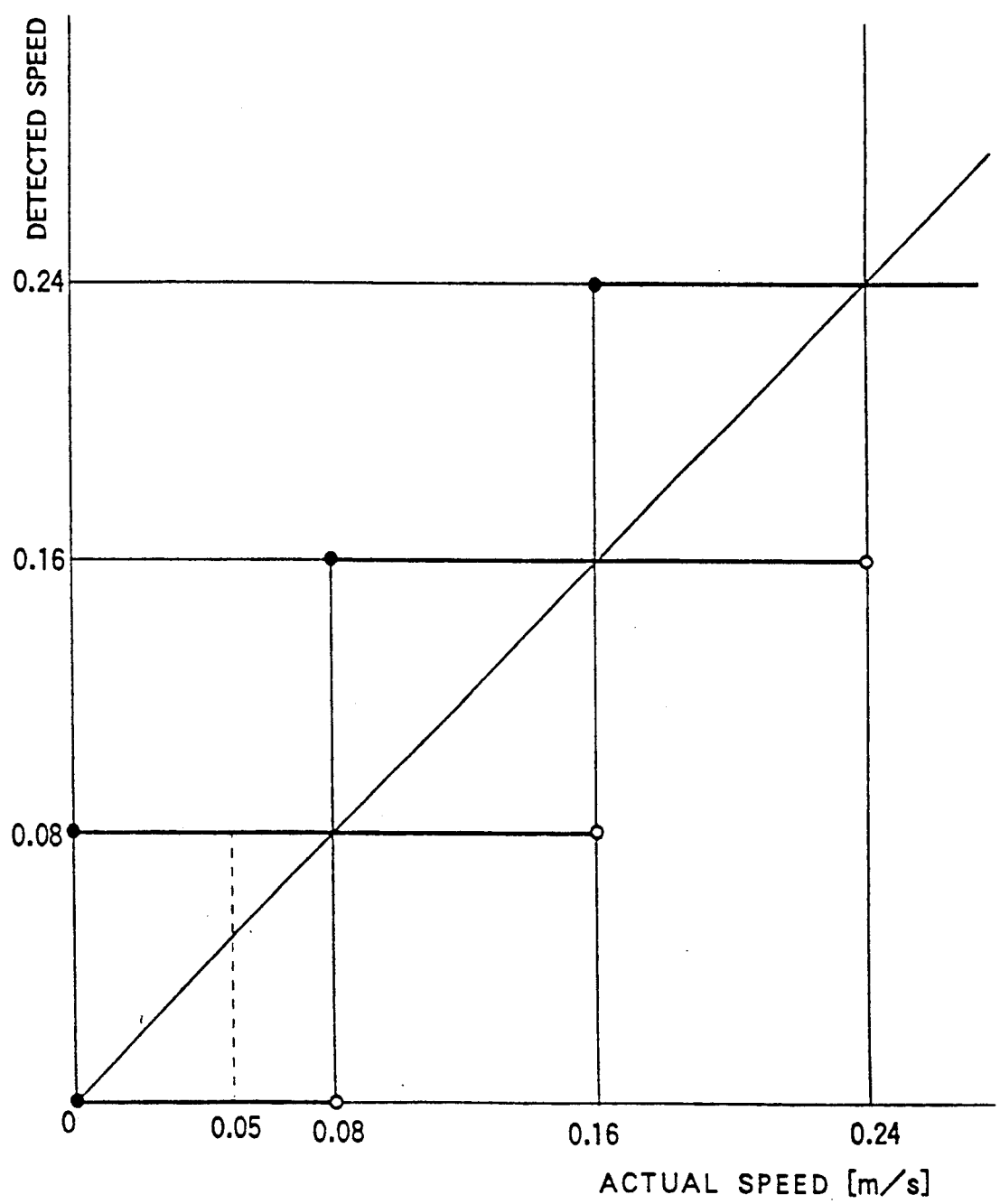

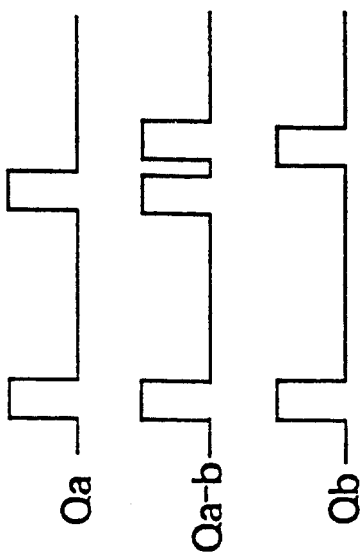
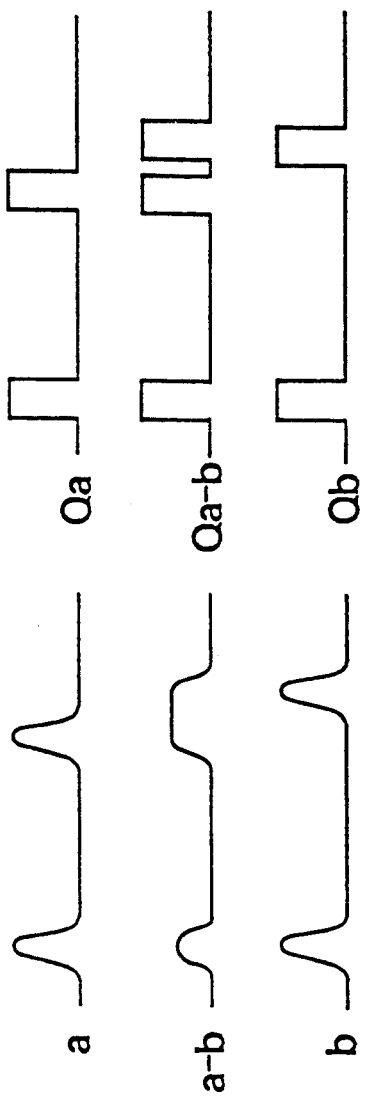
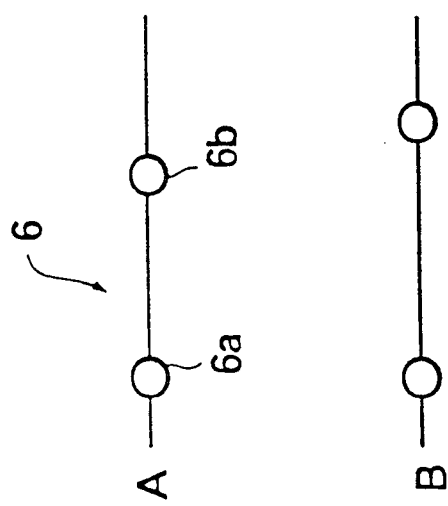

OPTICAL DISK UNIT

This application is a divisional of application Ser. No. 07/504,182, filed Apr. 4, 1990, now U.S. Pat. No. 5,157,645.

BACKGROUND OF THE INVENTION

1. Field of the Invention

The present invention relates to an optical disk unit that records and reads information to and from an optical disk, and particularly to an optical disk unit that can accurately measure the relative speed of a light spot radially moving on the optical disk to access a target track on the optical disk.

2. Description of the Prior Art

An optical disk unit employs a light spot to access one of a plurality of tracks formed on an optical disk. This track accessing operation is generally carried out by a combination of speed control and position control.

In the speed control, the relative speed of the light spot radially moving on the optical disk by crossing tracks is measured, and compared with a reference speed to provide a speed error signal. Based on the speed error signal, the speed of the light spot is controlled.

When the light spot reaches a target track, the position control is started to make the light spot follow the target track. In the position control, a positional error signal is provided based on an error between the position of the light spot and the target track. According to the positional error signal, the position of the light spot is controlled.

FIG. 1 shows a movement of the light spot on the optical disk. To access a target track where required data is recorded, at first the light spot is moved from a present track to the target track according to the speed control. When the light spot reaches the target track, the light spot is slowed down, and the speed control is switched to the position control.

To measure a relative speed of the light spot on the optical disk for the speed control, a conventional technique detects a signal from the optical disk, and generates a pulse whenever the light spot crosses one or a half track. An interval of pulses thus obtained corresponds to the relative speed of the light spot. The conventional technique measures time period of the interval, and executes arithmetic operations including a multiplicative inverting operation to find the relative speed of the light spot.

FIG. 4 shows the principle of the conventional speed measuring technique. In the figure, a curved line indicates temporal changes of an actual relative speed of the light spot, and a straight line indicates the measured relative speed of the same.

Pulses whose intervals change in response to the relative speed of the light spot are generated at t1, t2, and so on, as the light spot is moved on the optical disk. When a pulse is generated at t1, the time measurement starts. When the next pulse is generated at t2, an elapsed time (t2−t1) for the period from t1 to t2 is provided and held. An inverse number of the elapsed time for the period of (t2−t1) is calculated and multiplied by a proper coefficient to provide a speed d2, which is an averaged speed of the light spot moved relative to the optical disk for the period of (t2−t1). The speed d2 is held for a period from t2 to t3. This operation is repeated for each pulse generation to determine the relative speed of the light spot on the optical disk.

The technique mentioned above is relatively easy for providing the relative speed of a light spot. The technique has, however, several drawbacks. As shown in FIG. 4, the measured speed indicated line satisfactorily follows the actual speed only before t4. After t4, the measured speed greatly deviates from the actual speed. The reason of this is because the measured speed is not updated frequently in a deceleration state where the interval of pulses gradually gets longer. In an extreme case of beyond t7, a speed d7 measured at t7 is maintained forever, if no pulse is generated after t7, even when the actual speed becomes 0 after t7. If such an incorrect measurement is used for controlling the light spot, a phase delay may occur which destabilizes the motion of the light spot.

One of the techniques for providing information such as the relative speed of a light spot for various control purposes is a sample servo technique, which will be explained with reference to FIGS. 2 and 3.

An optical disk 1 shown in FIG. 2 has spiral or concentrical tracks 2. Servo areas 3 are intermittently formed on the tracks 2 to provide detection signals from which information for various control purposes is obtainable. FIG. 3 shows an example of the servo area 3. The servo area 3 of each track 2 involves wobbled pits 7 and 8 disposed on the left and right sides of the track, an access mark portion 6, a mirror portion 4, and a clock pit 5. The wobbled pits 7 and 8 provide tracking signals, and the mirror portion 4 provides a focus error signal. The clock pit 5 provides a system clock to be used for recording and reading operations.

The access mark portion 6 provides a pit pattern that is specific for predetermined tracks and is utilized to detect the number of tracks crossed by a light spot radially moving on the optical disk 1, in a target track accessing operation. FIG. 3 shows 16 pit patterns that repeat every 16 tracks.

FIG. 5 shows a conventional optical disk unit for achieving the sample servo technique explained above. In the figure, a laser beam source 10 emits a laser beam, which passes through a collimator lens 11, beam splitter 12, and objective lens 13, and the beam spot is incidence upon an optical disk 14. A reflection of the light spot from the optical disk 14 is passed through the objective lens 13, reflected by the beam splitter 12, and led to a photodetector 15.

The photodetector 15 provides an output signal 16, which is amplified by a preamplifier 17, and led to a read signal processing circuit (not shown) and a waveform shaping circuit 18, which provides a binary signal 19. The signal 19 is transferred to a clock generator 20, which regenerates a system clock 21 based on a clock pit of a servo area of the optical disk 14.

A timing signal generator 22 uses the system clock 21 to provide a timing signal 23 to be used for detecting an access mark from the binary signal 19. A crossed tracks number detector 24 uses the timing signal 23 to detect the access mark from the binary signal 19, and provides a crossed tracks number 25 when a change is detected in the access mark. The crossed tracks number indicates the number of tracks crossed by the light spot. The crossed tracks number 25 is supplied to a storage circuit 27 through a latch circuit 26, and multiplied by a coefficient to provide a speed data signal 28. The signal 28 is converted by a digital-to-analog converter 29 into a speed signal 30.

FIG. 6 shows relative speed characteristics measured by the conventional optical disk unit explained above. In the figure, the abscissa represents actual speeds, and the ordinate measured speeds. Values shown in the figure are based on a period of appearance of the servo areas, i.e., a sample period, of 20 μs and a track pitch of 1.6 μm. An actual speed in the range of 0 to 0.08 m/s will be measured as 0 or 0.08 m/s, and an actual speed in the range of 0.08 to 0.16 m/s will be measured as 0.08 or 0.16 m/s. The reason of this is because the resolution of the access marks is one track to cause a maximum error of 0.08 m/s.

The reading operation of the access marks in the servo areas by the conventional optical disk unit will be explained with reference to FIGS. 7a, 7b, and 7c.

FIG. 7a shows access marks of tracks A and B, FIG. 7b output signals based on the access marks of FIG. 7a, and FIG. 7c binary signals shaped from the output signals of FIG. 7b. The optical disk unit is storing sixteen kinds of reference binary patterns with which a detected pattern is checked to see whether it matches one of the reference binary patterns.

Supposing the binary pattern Qa of FIG. 7c is received, it is recognized that a light spot is on the track having the access mark A because the received signal matches one of the stored patterns. By comparing access marks read at two consecutive sample times with each other, the number of tracks crossed by the light spot during the sample period will be detected. For example, it is detected that the crossed tracks number is one from the access marks A and B. In this way, if a pattern that matches one of the 16 reference access mark patterns is detected, the number of tracks crossed by the light spot can be detected.

The light spot on the optical disk has a certain size, and therefore, signals such as a and b shown in FIG. 7b are sometimes detected between the tracks A and B, although the detected level thereof is low.

If such signals are obtained between the tracks, the signals may provide a combined pattern a-b or Qa-b shown in FIGS. 7b and 7c. Since the combined pattern does not match with any one of the stored patterns, it is judged that a read error has occurred, and no operation is carried out to find the crossed tracks number. Namely, a correct crossed track number will not be obtainable until a matching pattern is detected. This may reduce a chance of obtaining information for controlling the movement of the light spot, and lead to an insufficient control of the accessing operation.

The conventional optical disk unit has another problem of providing pattern signals alternately. When output signals from an optical disk are unstable or when tracks of the optical disk are eccentric relative to the center of the optical disk, binary pattern signals such as Qa and Qb of FIG. 7c may alternately be detected even when the light spot is stationary between the tracks A and B. This may happen during an accessing operation in which the light spot crosses a track in several sample periods, and particularly in a latter half of the accessing operation. If this happens, it is judged that the light spot is moving irregularly back and forth on the optical disk, and then, the light spot which is actually moving smoothly in one direction will wrongly be controlled.

As explained above, the light spot on the optical disk has a certain size, and therefore, detects signals between adjacent tracks of the optical disk. This may cause the following problems:

(1) A combined pattern such as Qa-b of FIG. 7c, if detected, is judged as a read error, and the optical disk unit carries out no operation of finding a crossed tracks number. This reduces a chance of correct control of the light spot, and destabilizes the movement of the light spot on the optical disk.

(2) Alternate detection of binary patterns from adjacent tracks also destabilizes the movement of the light spot on the optical disk, because the optical disk unit will judge from the alternate detection that the light spot is moving alternately in forward and backward directions, and unnecessarily control the movement of the light spot according to the judgment, even when the light spot is moving smoothly in one direction on the optical disk.

SUMMARY OF THE INVENTION

An object of the present invention is to provide an optical disk unit that can achieve a stable speed control of a light spot in accessing a track on an optical disk.

Another object of the present invention is to provide an optical disk unit that can accurately detect the speed of a light spot relative to an optical disk.

Still another object of the invention is to provide an optical disk unit that can correctly measure the speed of a light spot relative to an optical disk even in a decelerating state of the light spot.

Still another object of the invention is to provide an optical disk unit that can provide improved controllability for a high-speed accessing operation with minute reading error of servo information.

According to an aspect of the present invention, an optical disk unit having a light spot incident upon the optical disk. The light spot is moved to cross tracks formed on the optical disk. The tracks are provided with specific access marks. The number of access marks passed by the light spot as well as the number of tracks crossed by the light spot until a change is found in a detected access mark is counted. The latter number is divided by the former number and multiplied by a coefficient to provide a signal indicative of the speed of the light spot relative to the optical disk.

According to another aspect of the present invention, an optical disk unit comprises a pulse train generator for generating a train of pulses whose intervals change in response to changes in a speed of a light spot that is moved relative to an optical disk in a radial direction of the optical disk; a counter for counting an elapsed time of a pulse generated by the pulse train generator; a memory for storing an output of the counter until the pulse train generator generates the next pulse; and an arithmetic circuit for comparing an output of the counter with an output of the memory, and selecting larger one of the outputs. A speed of the light spot relative to the optical disk is measured according to the selected output.

According to still another aspect of the present invention, an optical disk unit employs conventionally used on-track access mark patterns and, in addition, intra-track access mark patterns. The on-track access mark patterns are based on access marks formed on tracks of an optical disk, and the intra-track access mark patterns are based on patterns that may be detected between adjacent tracks as combinations of the on-track access marks of the adjacent tracks. When a detected access mark pattern matches one of the intra-track access mark patterns, the optical disk unit of the present invention recognizes that the light spot is located between the adjacent tracks. Namely, the unit of the present invention decreases the read error due to the detection of the intra-track access mark pattern.

These and other objects, features and advantages of the present invention will be more apparent from the following detailed description of preferred embodiments in conjunction with the accompanying drawings.

BRIEF DESCRIPTION OF THE DRAWINGS

FIG. 6 is a view showing characteristics of light spot moving speeds measured by the prior art of FIG. 5;

FIGS. 7a to 7c are views showing pit arrangements of an access mark portion of an optical disk, and binary signals derived from the pit arrangements;

DETAILED DESCRIPTION OF THE EMBODIMENTS

Figure 8:
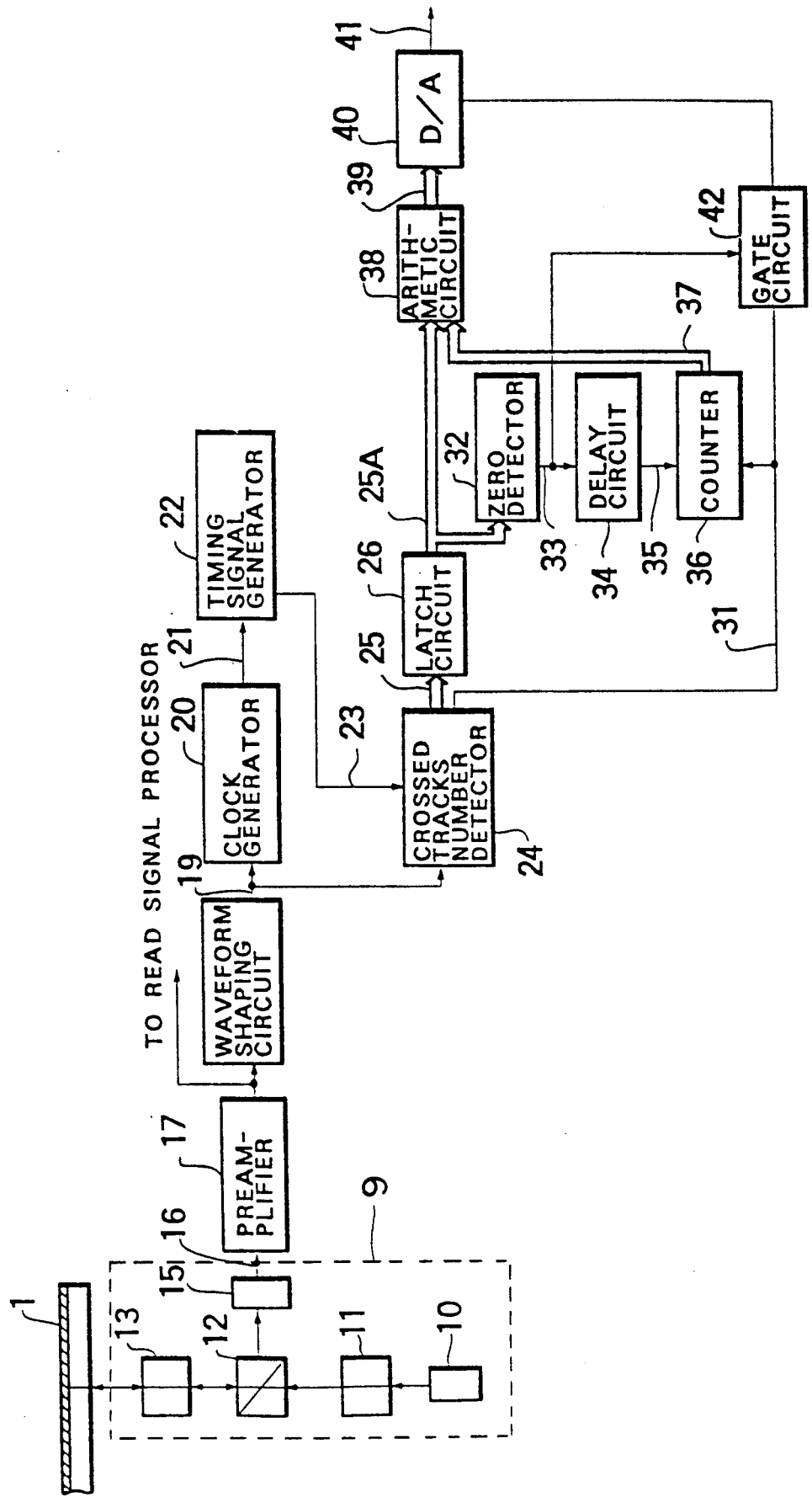
FIG. 8 is a block diagram showing an optical disk unit according to a first embodiment of the present invention.

FIG. 8 is a block diagram showing an optical disk unit according to the first embodiment of the present invention.

The optical head 9 comprises a laser beam source 10, a collimator lens 11, a beam splitter 12, an object lens 13, and a photodetector 15. The laser beam source 10 is, for example, a semiconductor laser, and emits a laser beam. The laser beam is passed through the collimator lens 11 and beam splitter 12, and converged by the object lens 13 into a very small light spot, which is incident upon the optical disk 1.

Reflection of the light spot from the optical disk 1 is passed through the object lens 13, reflected by the beam splitter 12, and led to the photodetector 15, which provides an output signal 16. The output signal 16 is amplified by a preamplifier 17 and supplied to a read signal processing circuit (not shown) and a waveform Shaping circuit 18, which provides a binary signal 19 to a clock generator 20. The clock generator 20 provides a system clock 21 based on a clock pit included in a servo area of the optical disk 1. Based on the system clock 21, a timing signal generator 22 generates a timing signal 23 to be used for detecting an access mark pattern from the binary signal 19.

A crossed tracks number detector 24 uses the timing signal 23 to detect the access mark pattern from the binary signal 19, and provides a crossed tracks number 25 according to a change detected in the access mark pattern. If no change is detected in the access mark pattern, the detector 24 provides a crossed tracks number of 0. The detector 24 also provides an access mark passing pulse 31 whenever the light spot passes over an access mark. Even when the access mark is not correctly read, the access mark passing pulse 31 is provided every time when the light spot passed over one access mark on the optical disk 1.

The crossed tracks number 25 is transferred to a latch circuit 26. The latch circuit 26 holds the crossed tracks number 25 until the next crossed tracks number is provided thereto, and provides a crossed tracks number 25A corresponding to the crossed tracks number 25 to a zero detector 32 and an arithmetic circuit 38.

The zero detector 32 judges whether or not the crossed tracks number 25A is zero. If it is not zero, the zero detector 32 provides a track crossed signal 33 to a delay circuit 34 and a gate circuit 42.

The delay circuit 34 properly delays the track crossed signal 33 to, for example, about one tenth of a sample period of the access mark passing pulse 31, and provides a reset signal 35 to reset a counter 36.

The counter 36 counts the number of access mark passing pulses 31 provided by the crossed tracks number detector 24, and provides a sample count 37 to the arithmetic circuit 38. The sample count 37 represents the number of access marks of the same track passed by the light spot. Namely, the sample count 37 corresponds to a time period during which the light spot was on the same track.

The arithmetic circuit 38 divides the crossed tracks number by the number of access marks passed by the light spot, and provides a speed data signal 39 that is proportional to a result of the division. The arithmetic circuit 38 comprises, for example, a ROM which is accessed by an upper address designated by the crossed tracks number 25A and a lower address designated by the sample count 37 to provide the speed data signal 39 which represents a value derived by dividing the crossed tracks number by the sample count and multiplying a result of the division by the coefficient.

The speed data signal 39 is supplied to a digital-to-analog converter 40 when the gate circuit 42 allows the same upon receiving the track crossed signal 33. The converter 40 converts the speed data signal into an analog speed signal 41.

Operation of the above arrangement will be explained.

The crossed tracks number detector 24 detects an access mark pattern and provides a crossed tracks number 25 representing the number of tracks crossed by the light spot on the optical disk 1. The crossed tracks number detector 24 also provides an access mark passing pulse 31 whenever the light spot passes over one access mark on the optical disk 1. According to the crossed tracks number 25, the latch circuit 26 provides a crossed tracks number 25A. The crossed tracks number 25A is transferred to the zero detector 32 and arithmetic circuit 38.

The zero detector 32 judges from the crossed tracks number 25A whether or not the number of tracks crossed by the light spot is zero. If the number is not zero, the zero detector 32 provides a track crossed signal 33 to the delay circuit 34 and gate circuit 42. The delay circuit 34 properly delays the track crossed signal 33, and provides a reset signal 35 to the counter 36.

Meantime, the counter 36 counts the number of access mark passing pulses 31 supplied by the crossed tracks number detector 24, and provides a sample count 37 to the arithmetic circuit 38. A count of the counter 36 is reset by the reset signal 35 from the delay circuit 34. Namely, the counter 36 is reset whenever a change is found in a detected access mark. This means that a count of the counter 36 will be large when a relative speed of the light spot is slow, and small when the same is fast. When the light spot relative speed is very fast, every detected access mark may be different from the previously detected access mark, and therefore, the counter 36 may count only 1.

Based on the crossed tracks number 25A and sample count 37, the arithmetic circuit 38 divides the number of tracks crossed by the light spot by the number of access marks passed by the light spot, and provides a speed data signal 39 proportional to a result of the division. The speed data signal 39 is supplied to the digital-to-analog converter 40 under the control of the gate circuit 42 when a change is found in a detected access mark, and converted into an analog speed signal 41.

Figure 10:
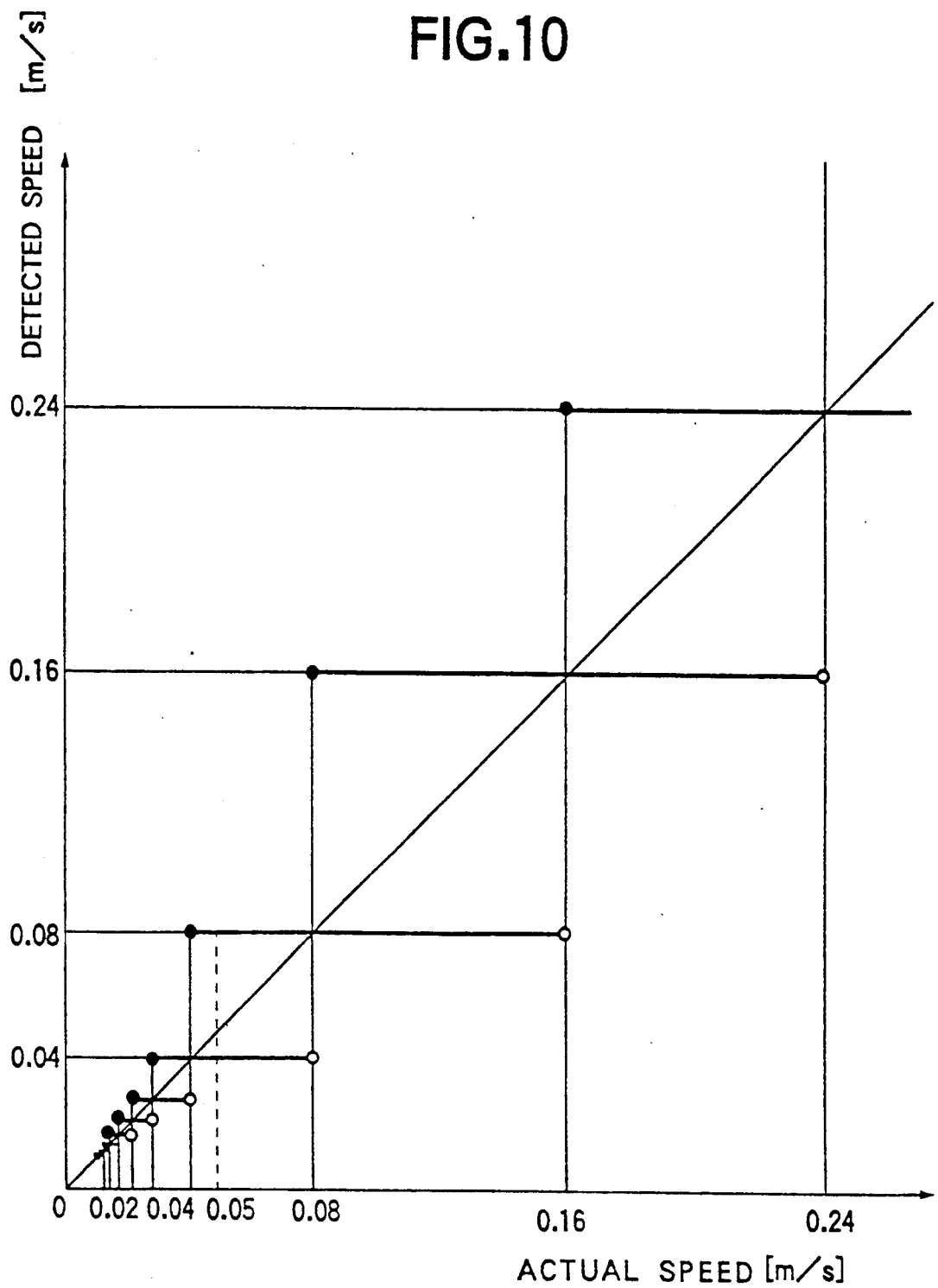
FIG. 10 is a view showing characteristics of light spot moving speeds measured by the first embodiment.

FIG. 10 shows speed measurement characteristics of the embodiment, in which the abscissa indicates actual speeds and the ordinate detected speeds, with a sample period of 20 $\mu$s and a track pitch of 1.6 $\mu$m. When an actual relative speed of the light spot is 0.05 m/s, the embodiment may detect a speed of 0.04 m/s or 0.08 m/s. Namely, the error in the embodiment will be 0.03 m/s at maximum. Compared to this, the conventional technique detects a speed of 0 or 0.08 m/s for the same actual speed, to provide an error of 0.05 m/s at maximum as shown in FIG. 6.

As is apparent from FIG. 10, the embodiment can greatly reduce an error in detecting the relative speed of a light spot on an optical disk, particularly in a slow speed state of the light spot speed. Accordingly, the embodiment can improve, in a data accessing operation, a speed detecting resolution of the light spot particularly in an important slow speed state, thereby improving the speed controlling accuracy of the light spot and realizing a high-speed access.

As explained above, the first embodiment of the present invention counts the number of access marks passed by a light spot as well as the number of tracks crossed by the light spot until a change is found in a detected access mark, divides the latter number by the former number, and provides a speed signal proportional to a result of the division. With a simple structure, the first embodiment can remarkably reduce an error in the measurement of the light spot relative speed, particularly in a slow speed state, compared to the conventional technique. The first embodiment thus improves controllability and track tracing performance of the light spot, and reduces access time.

The present invention can effectively control the light spot movement even when the light spot crosses several tracks in one sample period. This will be explained next.

When the light spot crosses several tracks in one sample period, an angle between a track longitudinal direction and a light spot moving direction becomes larger. Namely, a crossing angle of the light spot with respect to an access mark becomes larger, so that the access mark may be read obliquely to cause a read error. If the read error occurs, a crossed tracks number at the sample timing is not provided correctly. This may deteriorate the accuracy of speed control of the light spot.

If such a read error occurs, the crossed tracks number detector 24 of the embodiment of FIG. 8 provides a crossed tracks number of 0. When an access mark is correctly read next time, the crossed tracks number detector 24 provides a crossed tracks number including tracks crossed during the read error period. During this read error period, the crossed tracks number detector 24 continuously provides an access mark passing pulse 31 whenever the light spot passes over one access mark, so that the arithmetic circuit 38 may correctly calculate the average speed of the light spot during the period.

Figure 9A:
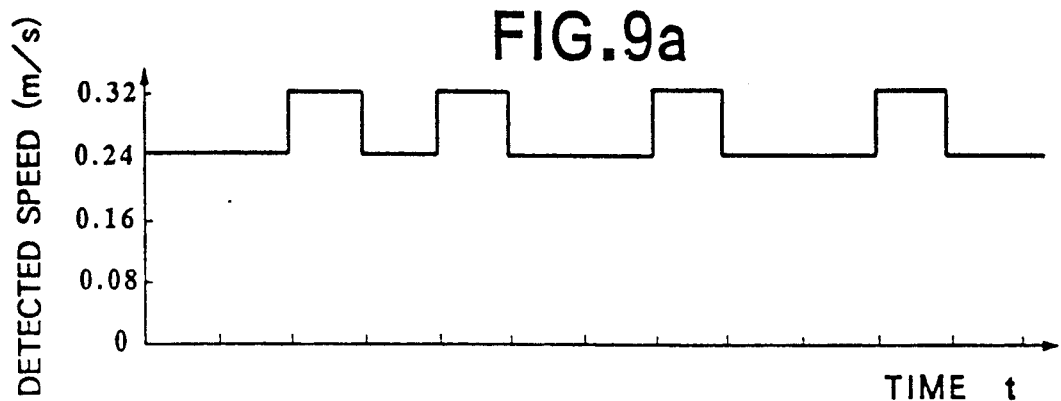
FIGS. 9a to 9c are views showing actual speed characteristics of a light spot, speed characteristics of the light spot measured by the prior art, and speed characteristics of the light spot measured by the present invention, respectively.
Figure 9B:
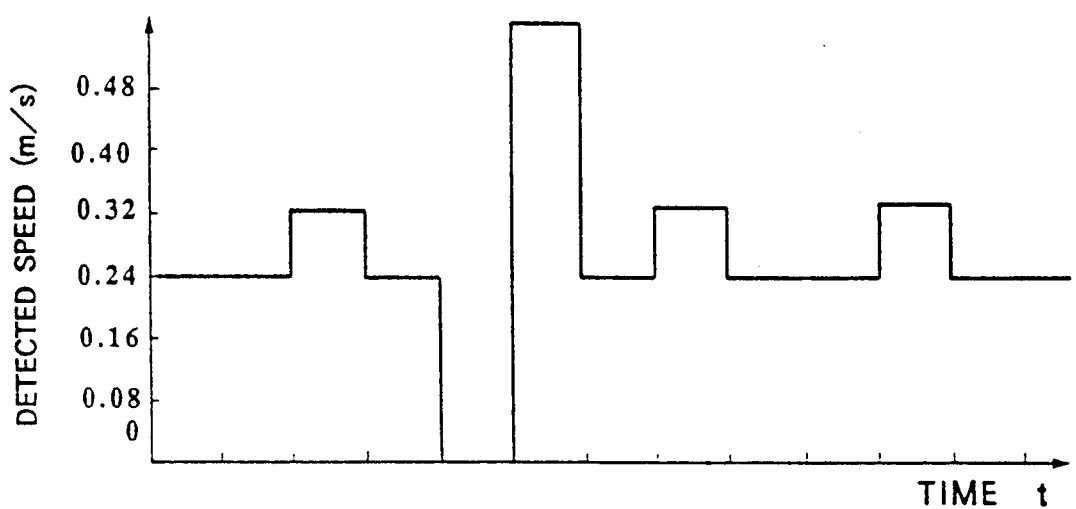
Figure 9C:

FIG. 9a shows a light spot actual speed detected with no read error. FIG. 9b shows the same light spot speed but detected by the conventional optical disk unit. It is apparent that FIG. 9b greatly differs from FIG. 9a. FIG. 9c shows the same light spot speed detected according to the present invention. FIG. 9c is averaged at a speed changing portion and analogous to the correct detected speed of FIG. 9a.

The above features of the present invention are realized by the crossed tracks number detector 24 for finding a change in a detected access mark and providing the number of tracks crossed by the light spot, the counter 36 for counting the number of access marks passed by the light spot until the change in the detected access mark is found, and the arithmetic circuit 38 for providing a speed signal corresponding to a value obtainable by dividing the crossed tracks number by the count of the counter 36.

Figure 11:
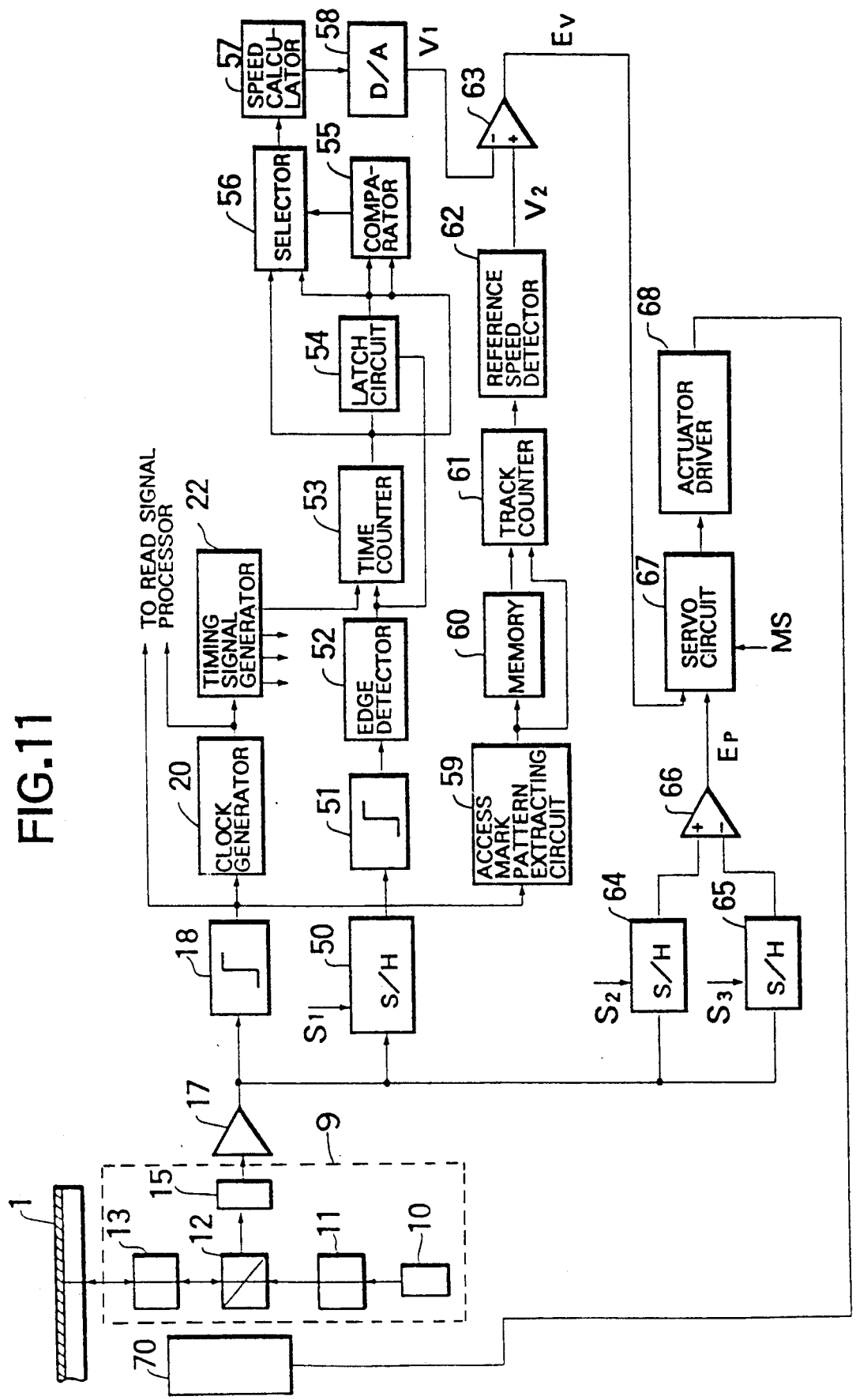
FIG. 11 is a block diagram showing an optical disk unit according to a second embodiment of the present invention.
Figure 12:
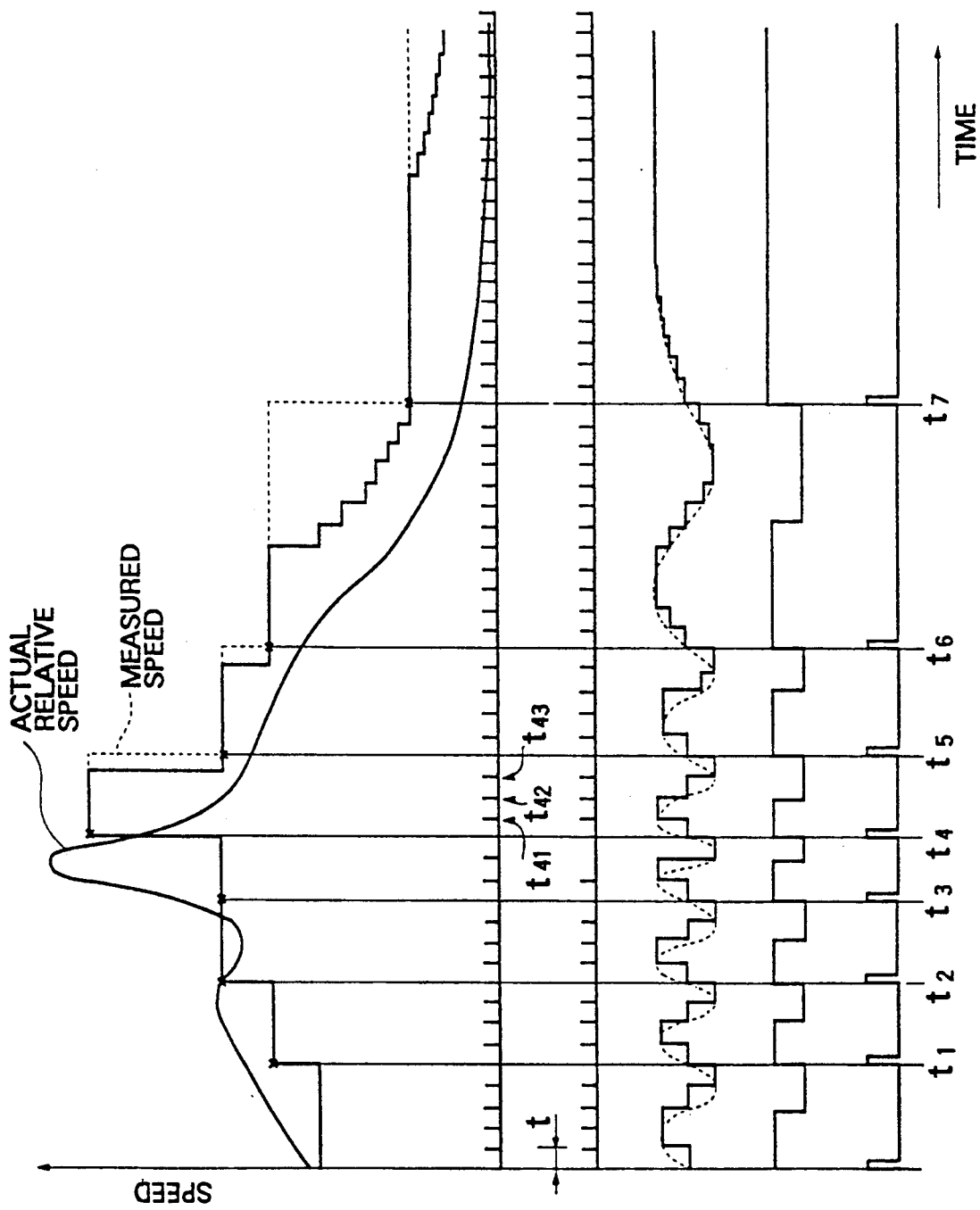
FIGS. 12a to 12e are views showing light spot moving speeds measured by the second embodiment.
Figure 13:
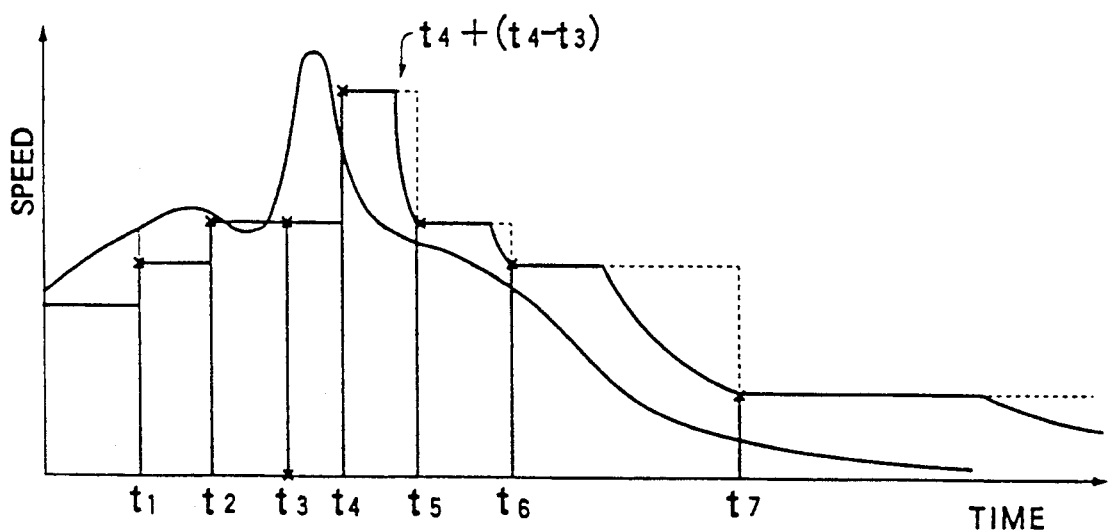
FIG. 13 is a view showing light spot moving speeds measured by a modification of the second embodiment.

An optical disk unit according to the second embodiment of the invention will be explained with reference to FIGS. 11 to 13.

The optical head 9 includes a laser beam source 10, a collimator lens 11, beam splitter 12, an object lens 13, and a photodetector 15. The laser beam source 10 such as a semiconductor laser emits a laser beam. The laser beam is passed through the collimator lens 11 and beam splitter 12, and converged by the object lens 13 into a very small light spot, which is incidence upon the optical disk 1.

A reflected light beam from the optical disk 1 is passed through the object lens 13, reflected by the beam splitter 12, and led to the photodetector 15, which provides a detected signal. The detected signal is amplified by a preamplifier 17 and supplied to a read signal processor (not shown) and a waveform shaping circuit 18, which provides a binary signal to a clock generator 20.

Figure 1:
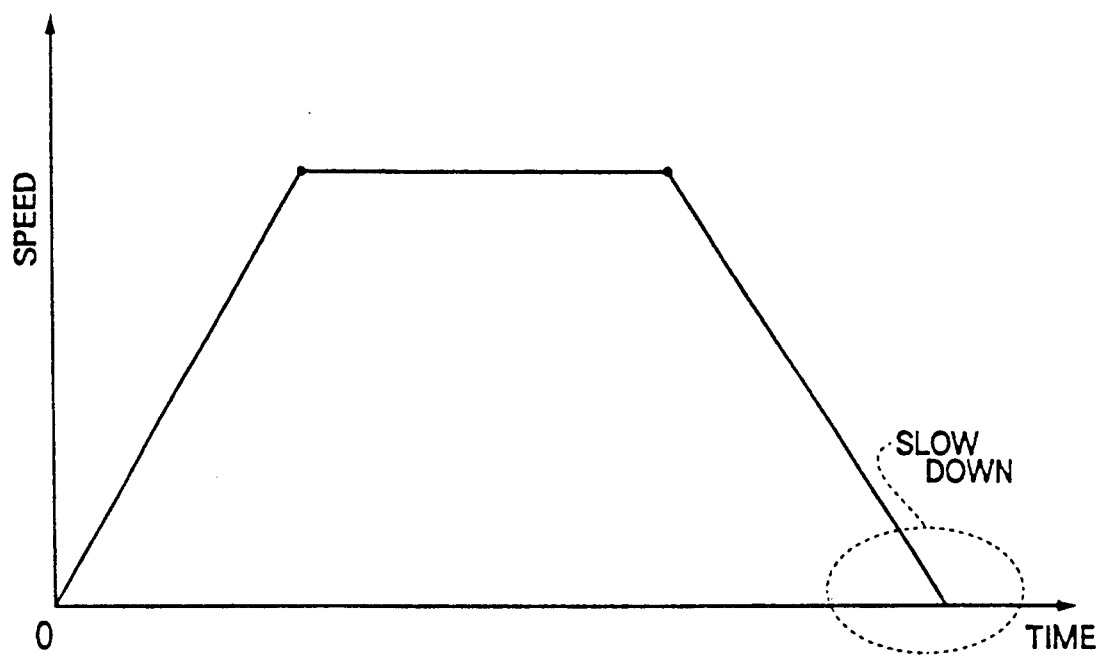
FIG. 1 is a view for explaining speed control of a light spot in a data accessing operation.
Figure 2:
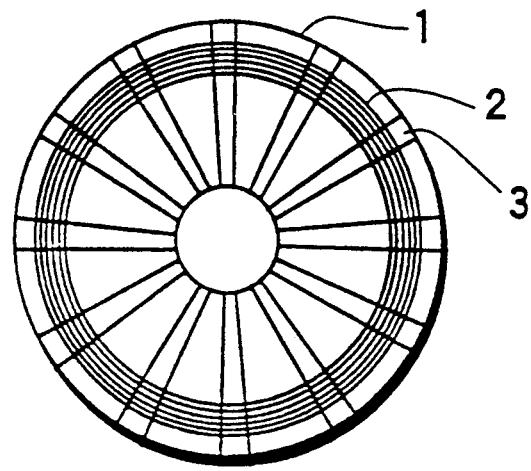
FIG. 2 is a schematic view showing a sample servo format optical disk.
Figure 3:
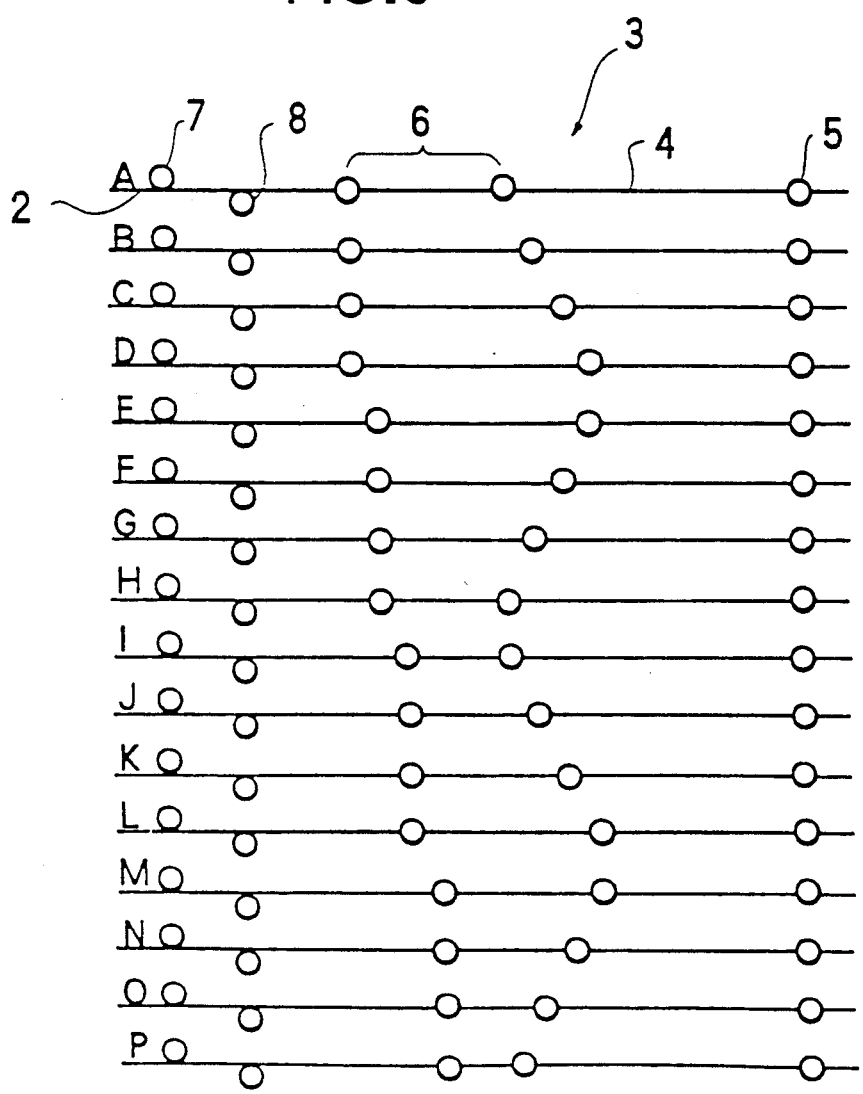
FIG. 3 is a view showing servo patterns formed on the optical disk of FIG. 2.
Figure 4:
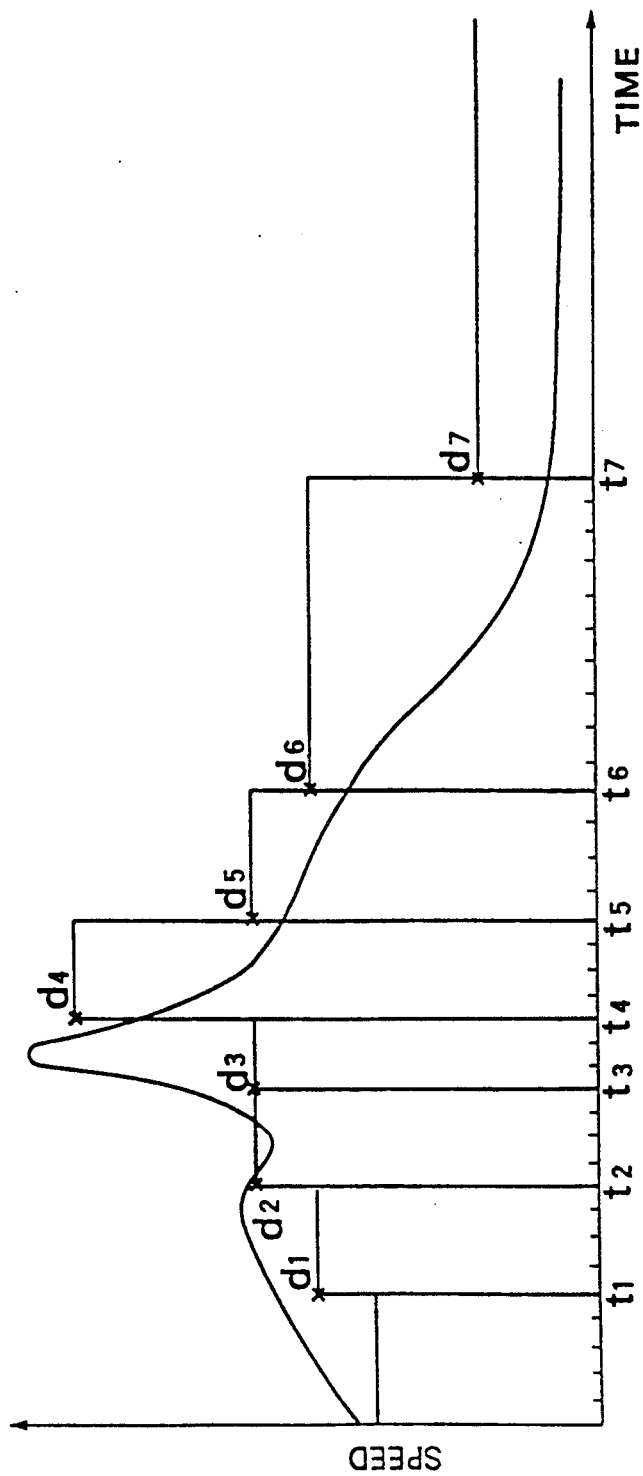
FIG. 4 is a view showing light spot moving speeds measured by a conventional technique.
Figure 5:
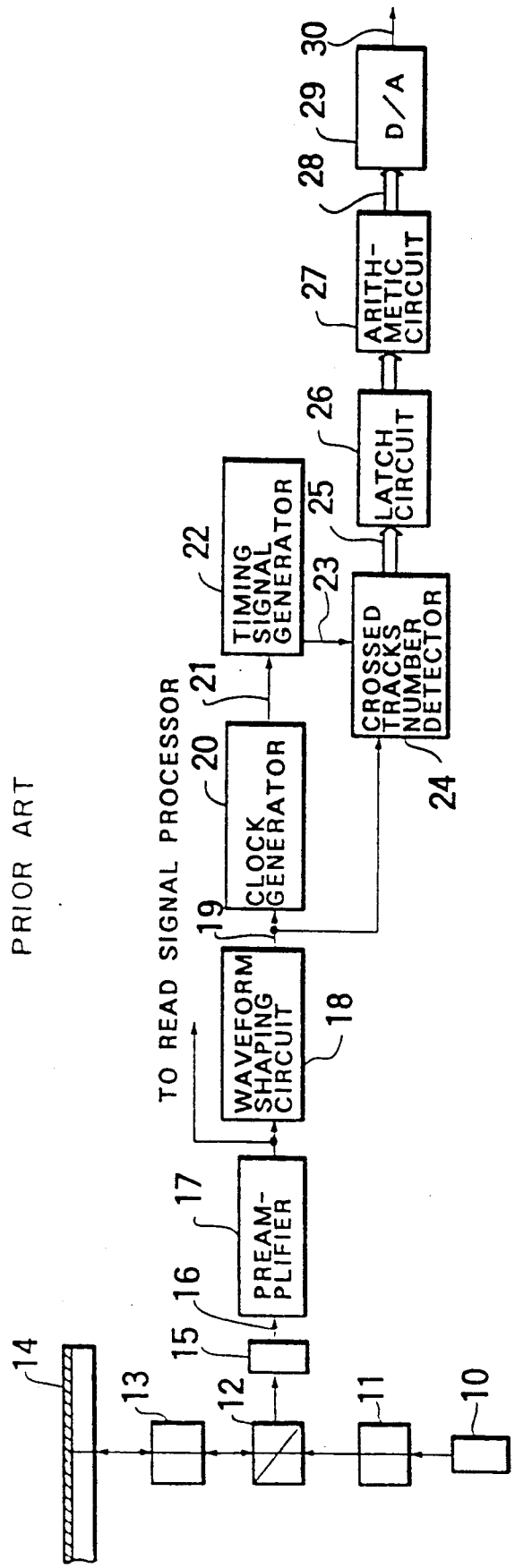
FIG. 5 is a block diagram showing an optical disk unit according to a prior art.

Based on the binary signal, the clock generator 20 generates a system clock that corresponds to a clock pit 5 (FIG. 3) included in a servo area formed on the optical disk 1. The system clock is supplied as a system clock to the read signal processor (not shown) and a timing signal generator 22, which generates various timing signals according to the system clock, required by various components.

The amplified signal from the preamplifier 17 is also supplied to a sample and hold circuit 50. In response to a sample timing signal S1 from the timing signal generator 22, the sample and hold circuit 50 samples and holds a peak value of a signal corresponding to the clock pit in the amplified signal. An output of the sample and hold circuit 50 is supplied to a waveform shaping circuit 51, which provides a binary signal one period of which corresponds to one track.

An edge detector 52 may be a monostable multivibrator, and generates a thin pulse at every edge of a rise or fall of the binary signal provided by the waveform shaping circuit 50, thereby providing a train of pulses whose intervals change in response to a relative speed of the light spot radially moving on the optical disk 1.

The pulse train from the edge detector 52 is applied to a reset input R of a time counter 53. A clock input CK of the time counter 53 receives a timing signal from the timing signal generator 22. An interval of the timing signals corresponds to a sample period. When the reset input R of the time counter 53 receives a pulse, the time counter 53 is reset. Thereafter, the time counter 53 counts up the number of pulses applied to the clock input CK thereof. Namely, whenever the edge detector 52 provides a pulse, the time counter 53 starts to count a sample number, and provides a digital output indicative of the sample number. By multiplying the sample number by the sample period, an elapsed time will be obtained. Therefore, an output of the time counter 53 just before reset indicates an interval of pulses provided by the edge detector 52.

An output pulse of the edge detector 52 is provided as a latch timing signal to a latch 54 acting as storage means. Upon receiving the latch timing signal, the latch 54 stores a digital output of the time counter 53. Namely, the latch 54 holds a count value of the time counter 53 just before the time counter 53 is reset.

Outputs of the time counter 53 and latch 54 are provided to a comparator 55 and a selector 56. The comparator 55 compares the outputs of the time counter 53 and latch 54 with each other, and provides a binary signal indicating which of them is larger than the other.

A selector 56 receives the binary output of the comparator 55 as a select signal, selects larger one of the outputs of the time counter 53 and latch 54, and provides the selected one to a speed calculator 57.

The speed calculator 57 calculates an inverse number of the output value of the selector 56, and multiplies the inverse number by a coefficient that is set according to the sample period, track pitch, etc., thereby providing a relative speed of the light spot moving radially on the optical disk 1. The speed calculator 57 then provides a digital output corresponding to the relative speed of the light spot to a digital-to-analog converter 58.

The digital-to-analog converter 58 converts the digital output into a speed signal V1, which is provided to a differential amplifier 63, in which the signal V1 is subtracted from a reference speed Signal V2.

The reference speed signal V2 indicates a reference value of the relative speed of the light spot in a track accessing operation. The reference speed signal V2 is based on a detection signal of an access mark portion 6 of a servo area 3 of the optical disk 1, and generated by an access mark pattern extracting circuit 59, memory 60, track counter 61, and a reference speed detector 62.

Namely, an output of the waveform shaping circuit 18 is provided to the access mark pattern extracting circuit 59, which extracts a binary pattern, i.e., an access mark pattern, according to the detection signal of the access mark portion 6 at every sample timing. The extracted access mark pattern is provided to the memory 60 and track counter 61. The track counter 61 compares the access mark pattern just extracted with an access mark pattern extracted at preceding sample timing and stored in the memory 60, finds the number of tracks crossed by the light spot during an interval between the two sample timings, accumulates the crossed tracks number, and provides the total number of tracks crossed till now by the light spot in the track accessing operation.

The reference speed detector 62 subtracts the total track number obtained by the track counter 61 from a track number set at the start of the track accessing operation as the number of tracks which must be crossed by the light spot to reach a target track, thereby finding the number of remaining tracks up to the target track. The reference speed detector 62 then generates the reference speed signal V2 corresponding to the number of remaining tracks. The reference speed detector 62 has a ROM table that is storing relations of the numbers of remaining tracks and optimum reference speeds, and finds an optimum reference speed in the ROM table for a given remaining track number to provide the analog reference speed signal V2.

The differential amplifier 63 amplifies the difference (V2−V1) between the measured speed signal V1 and the reference speed signal V2, and provides a speed error signal EV indicative of an error of the measured speed. The speed error signal EV is supplied to a servo circuit 67.

The servo circuit 67 also receives a positional error signal EP that is indicative of a positional error of the light spot relative to the target track in the radial direction of the optical disk 1. The positional error signal EP is generated by sample and hold circuits 64 and 65, and differential amplifier 66. The sample and hold circuits 64 and 65 receive sample timing signals $2 and $3, respectively, from the timing signal generator 22, to sample and hold signals corresponding to first and second wobbled pits 7 and 8 from the detection signal provided by the preamplifier 17. The differential amplifier 66 amplifies the difference of outputs of the sample and hold circuits 64 and 65, and provides the positional error signal EP.

When a distance from a start track to the target track is relatively long, the track accessing process can generally be divided into an acceleration period during which the relative speed of the light spot is gradually increased, a constant speed period during which the relative speed of the light spot is kept constant until the light spot is brought close to the target track, and a deceleration period during which the relative speed of the light spot is decelerated in the vicinity of the target track. During these periods, the relative speed of the light spot is controlled according to the speed error signal EV. When the light spot reaches the target track, the light spot is controlled according to the positional error signal EP to trace the target track.

To achieve such track accessing control of the light spot, the servo circuit 67 selects one of the speed error signal EV and positional error signal EP according to a mode switching signal MS, and provides the selected one through a phase compensating circuit, etc., to an actuator driver 68. The actuator driver 68 amplifies the output signal of the servo circuit 67 to provide an appropriate signal to an actuator 70.

With reference to time charts of FIGS. 12a to 12e, an operation of the embodiment of the present invention for measuring the relative speed of the light spot that is moving radially on the optical disk 1 will be explained in detail.

In FIG. 12a, a curved line indicates temporal changes of actual relative speed of the light spot, a dotted line the same speed but measured by the conventional optical disk unit, and a solid uncurved line the same speed but measured by the embodiment of the present invention. FIG. 12b shows a sample timing signal S1, FIG. 12c a sample and hold signal of the clock pit provided by the sample and hold circuit 50 according to the sample timing signal S1, FIG. 12d a binary signal provided by the waveform shaping circuit 51, and FIG. 12e waveform of a pulse train provided by the edge detector 52.

As shown in the figures, pulses provided by the edge detector 52 are synchronous to the sample timing signal S1. Each pulse of the edge detector 52 is given to the reset input R of the time counter 53. The clock input CK of the time counter 53 receives the sample timing signal S1. Accordingly, whenever the edge detector 52 provides a pulse, the time counter 53 measures an elapsed time after the generation of the pulse until the next sample timing, as a multiple of a cycle $\tau$ of the sample timing signal S1.

During the acceleration and constant speed periods, an output of the latch 54 is larger than or equal to an output of the time counter 53. The selector 56 selects, therefore, the output of the latch 54 according to an output of the comparator 55. Namely, the selector 56 selects, at the present sample timing, a time difference between the present and preceding pulses generated by the edge detector 52, and provides the same to the speed calculator 57.

In the decelerating period, the time counter 53 measures an elapsed time from a pulse generated by the edge detector 52 at the present sample timing until the next sample timing, as a multiple of the cycle $\tau$ of the sample timing signal S1, thereby estimating the relative speed of the light spot for the preceding sample timing. This operation will be explained for a time period between t4 and t5 of FIG. 12. Each interval between t4, t41, t42, and t43 is one sample period $\tau$.

(1) At t4, edge detector 52 generates a pulse, and the time counter 53 counts "1" at t4. Meantime, according to the pulse generated by the edge detector 52, the latch 54 latches at t4 the number "3" of the sample timing signals S1 for the time period between t3 and t4. At this moment, the comparator 55 judges that the output of the latch 54 is larger than the output of the time counter 53, so that the selector 56 selects the output "3" of the latch 54, and provides the selected one to the speed calculator 57.

(2) At the next sample timing t41, the edge detector 52 does not generate a pulse, so that the latch 54 keeps the number "3" as it is, and the time counter 53 increases its count to "2" at t41. In this case also, the comparator 55 judges that the output of the latch 54 is larger than the output of the time counter 53, so that the selector 56 continues to provide the output "3" of the latch 54 to the speed calculator 57.

(3) At the next sample timing t42, the edge detector 52 does not generate a pulse, so that the latch 54 keeps the number "3" as it is, and the time counter 53 increases its count to "3" at t42. Since the outputs of the time counter 53 and latch 54 are each "3", the selector 56 continues to provide the value "3" to the speed calculator 57.

(4) At the next sample timing t43, the edge detector 52 does not generate a pulse, so that the latch 54 keeps the number "3" as it is, and the time counter 53 increases its count to "4" at t43. Then, the comparator 55 judges that the output "4" of the time counter 53 is larger than the output "3" of the latch 54, and therefore the selector 56 selects the output "4" of the time counter 53 and provides the same to the speed calculator 57. As a result, the speed calculator 57 provides a speed signal having a value smaller than a preceding value. The value of the relative speed signal is equal to a value for a time when the next pulse is provided by the edge detector 52.

As indicated with the solid uncurved line in FIG. 12a, the speed provided by the speed calculator 57 can predict a reduction in the actual speed in the deceleration period. Namely, during the deceleration period, the present invention can satisfactorily measure the light spot relative speed with small phase delay.

In the above explanation, the clock input CK of the time counter 53 receives, as a time counting signal, the sample timing signal S1 from the timing signal generator 22. Instead, a faster system clock may be provided to the clock input CK as a modification of the second embodiment of the invention. In this case, a value counted by the time counter 53 substantially continuously increase, so that relations of the actual speed and measured speed will be as shown in FIG. 13. Operations of this modification in the acceleration and constant speed periods are similar to those of the second embodiment. According to an output of the comparator 55, the selector 56 selects an output of the latch 54, i.e., a time period counted between a last pulse and the preceding pulse that have been generated by the edge detector 52, and provides the selected one to the speed calculator 57.

An operations of the modification for the deceleration period from t4 to t5 will be explained.

When the edge detector 52 generates a pulse at t4, the latch 54 is holding a time count (t4−t3) for a period between t4 and t3, and the time counter 53 starts to count an elapsed time from t4. Up to t4+(t4−t3), an output of the latch 54 is larger than that of the time counter 53. After that, however, an output of the counter will be larger than an output of the latch 54. Accordingly, according to an output of the comparator 55, the selector 56 selects the output of the time counter 53, and provides the selected one to the speed calculator 57. Then, a measured speed calculated by the speed calculator 57 decreases until the edge detector 52 generates a pulse, as indicated with the thick line of FIG. 13. This decreasing curve corresponds to changes in output values of the time counter 53 that gradually decrease in response to the high-speed system clocks. In this way, the modification satisfactorily predicts the reduction in the light spot relative speed during the deceleration period, and demonstrates only a little phase delay.

The above explanations relate to the sample servo type optical disk unit. For a continuous servo type optical disk unit, track passing pulses obtainable from an optical disk may be used to predict a reduction in the relative speed of a light spot during the deceleration period with a little phase delay.

According to the above embodiments, the speed of a light spot relative to an optical disk in the radial direction thereof can be measured satisfactorily even for the deceleration period. Based on such speed measurement, the relative speed of the light spot can be controlled stably with a little phase delay in a track accessing operation.

An optical disk unit according to the third embodiment of the invention will be explained with reference to FIGS. 14 and 15.

Figure 14A:
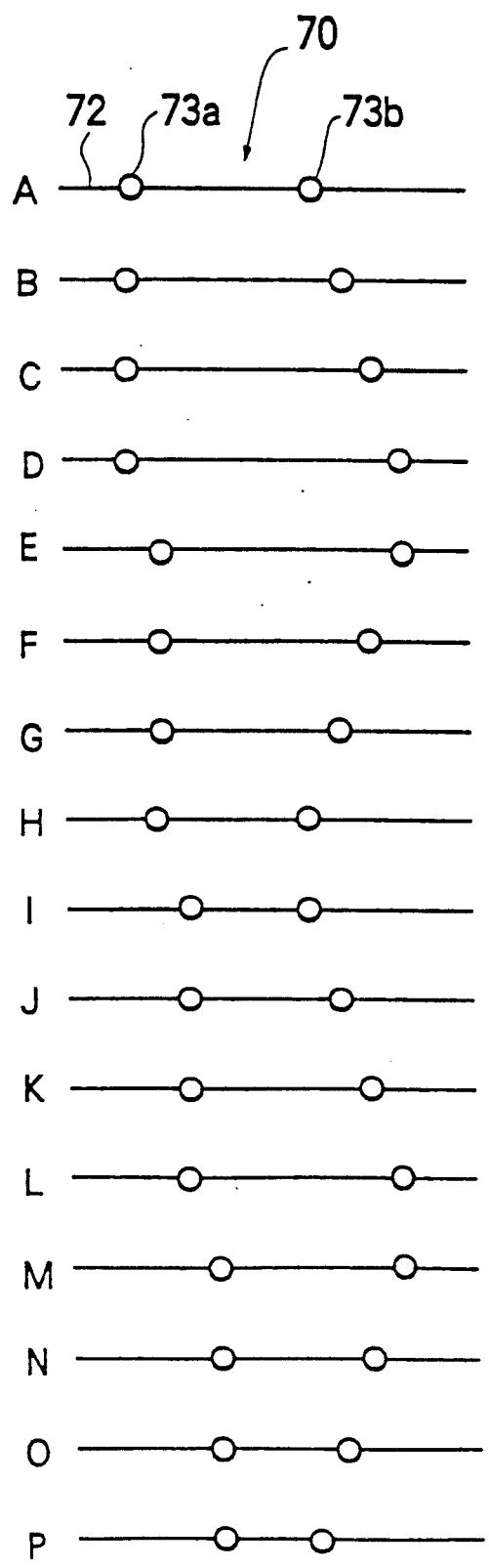
FIGS. 14a and 14b are views showing access marks stored in a binary pattern memory of an optical disk unit according to a third embodiment of the present invention, and waveforms of output signals derived from the access marks.

FIG. 14 is a view showing access marks employed in the third embodiment. In FIG. 14a, numeral 70 denotes an access mark portion arranged in each of servo areas that are intermittently arranged on tracks of an optical disk. The tracks are concentrical or spiral similar to those of FIG. 3. In this embodiment, each access mark portion involves two pits 73a and 73b that are arranged on a track centerline 72. Combinations of the two pits 73a and 73b express 16 kinds of access marks A to P.

Figure 14B:
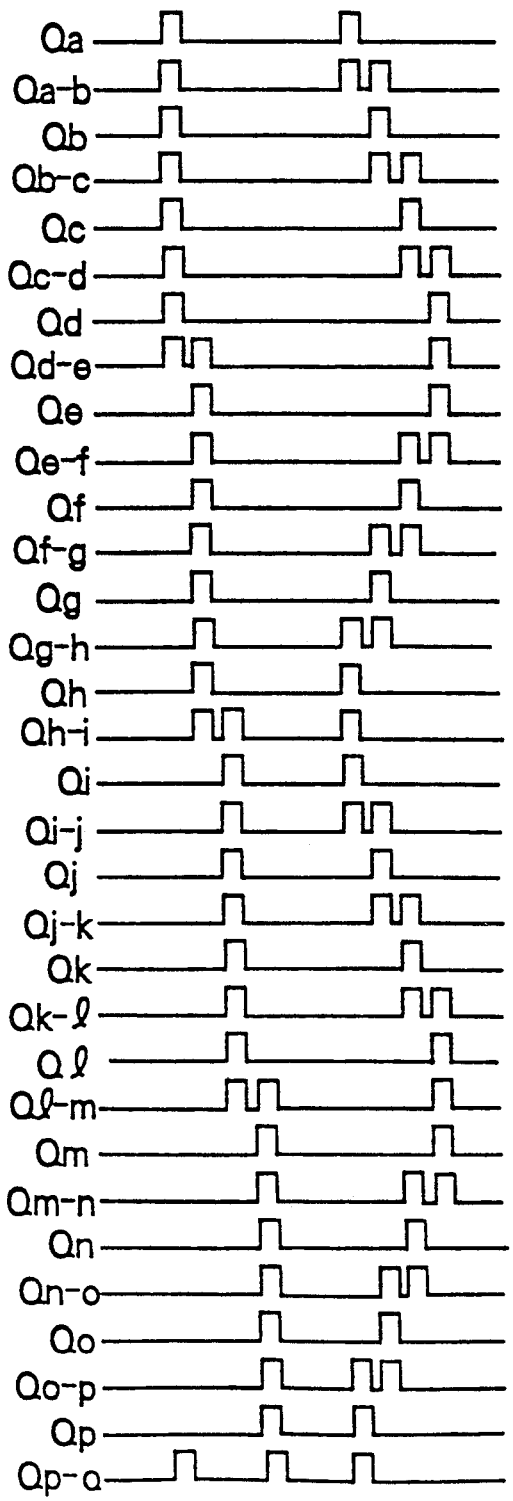

FIG. 14b is a view showing shaped binary access mark patterns derived from the access marks of FIG. 14a. For example, the access mark A corresponds to a binary access mark pattern Qa. A binary access mark pattern Qa-b represents a combination of patterns Qa and Qb. This sort of combined pattern is usually obtained between adjacent tracks due to an influence of access marks of the adjacent tracks. In this third embodiment, the access marks A to P are so selected that combinations of the patterns differ from one another. Accordingly, patterns to be used for detecting the moving state of a light sot on an optical disk are 32 in total, i.e., 16 on-track patterns and 16 intra-track patterns. Based on these patterns, a position of the light spot can be detected.

Figure 15:
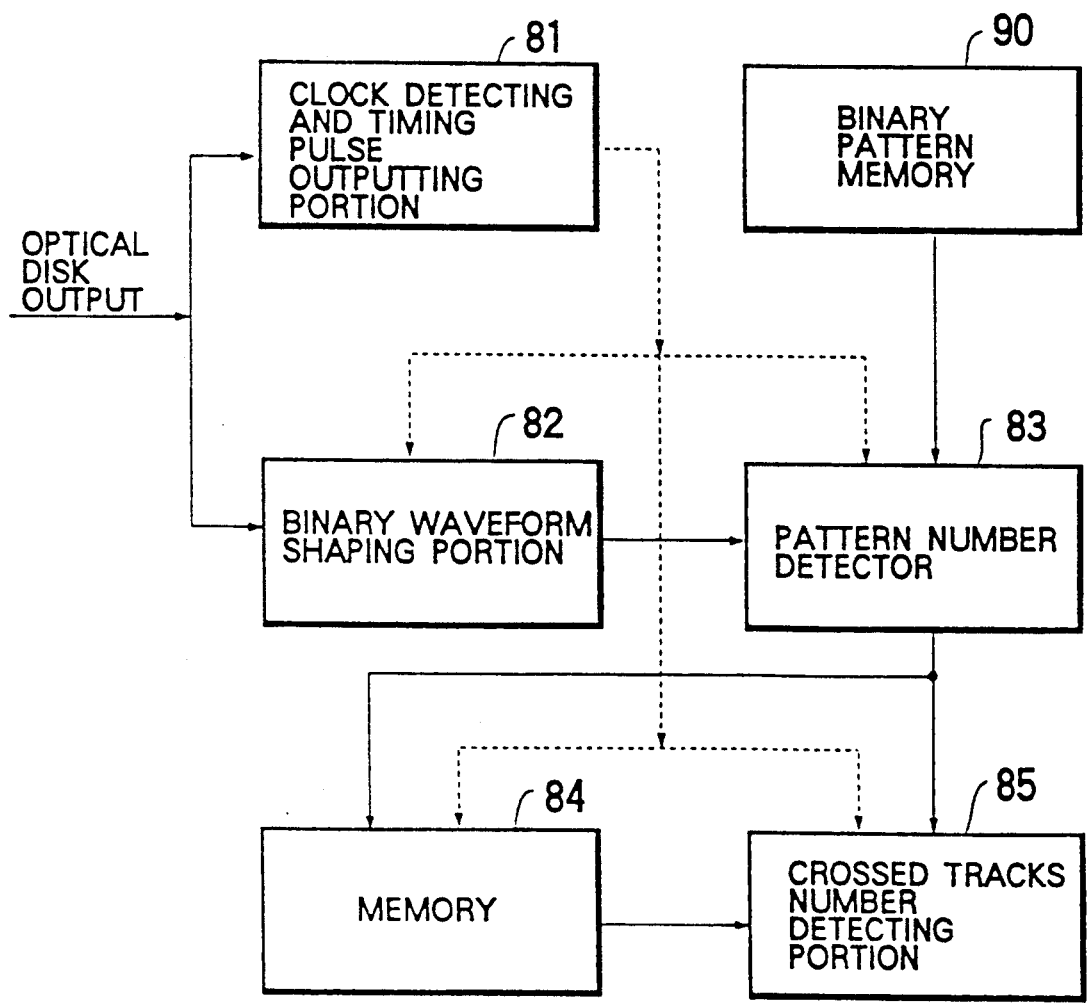
FIG. 15 is a block diagram showing a crossed tracks number detecting circuit of the third embodiment.

FIG. 15 is a block diagram showing a crossed tracks number detector according to the third embodiment. The detector of FIG. 15 is a portion for processing some of information pieces read out of the servo areas of the optical disk, for the purpose of a track accessing operation. This portion cooperates with conventional recording and reading portions.

A signal obtained from a clock pit of the servo area is provided to a clock detecting and timing pulse generating portion 81, which provides timing signals indicated with dotted lines to a binary waveform shaping portion 82, pattern number detector 83, a memory 84, and a crossed tracks number detector 85.

The binary waveform shaping portion 82 receives an analog signal from the access mark portion 70 of the servo area. The binary waveform shaping portion 82 generates a binary signal according to the received analog signal, and provides the same to the pattern number detector 83.

The pattern number detector 83 receives the binary signal as well as a signal from a binary pattern memory 90 which is storing all the 32 patterns in the order of FIG. 14b. The pattern number detector 83 checks to see whether the received binary signal matches one of the stored 32 patterns, and, if matched, provides a pattern number of the matched pattern.

The memory 84 receives a signal from the pattern number detector 83. Data stored in the memory 84 can be updated by a latch circuit, etc.

The crossed tracks number detector 85 receives signals from the pattern number detector 83 and memory 84, and calculates how many tracks are crossed by the light spot on the optical disk during the sample period.

The tracks of the optical disk generally have addresses, which are read by an optical pickup (the light spot) of the optical disk unit in recording and reading states. A position of the optical pickup (the light spot) is, therefore, easily found from the addresses in the recording and reading states. In an accessing state, however, the addresses are not readable. This is the reason why a control system such as one shown in FIG. 15 is needed to detect a movement of the light spot, i.e., the optical pickup.

When the access operation is started, the optical pickup reads the access mark portion 70 of the servo area of the optical disk. A read signal "A" (an access mark pattern) is shaped by the binary waveform shaping portion 82, and provided as a binary signal to the pattern number detector 83. The pattern number detector 83 compares the binary signal with the 32 patterns stored in the binary pattern memory 90 to see whether the signal A matches one of the patterns. Similarly, signals are sequentially read from the access mark portions of the optical disk, and judged in the same manner.

When a read signal matches one of the patterns stored in the binary pattern memory 90, a pattern number of the matched pattern is provided to the memory 84 and crossed tracks number detector 85. For example, the signal A of FIG. 14a has a pattern number of 1, and a signal P has a pattern number of 16. These pattern numbers can provide a relative position of the light spot on the optical disk.

Supposing that the memory 84 holds the pattern number 1 of the signal A and that the signal B is provided to the pattern number detector 83, the pattern number 1 of the signal A held in the memory 84 is transferred to the crossed tracks number detector 85, and the pattern number 2 of the signal B is newly held in the memory 84 and provided to the crossed tracks number detector 85.

The crossed tracks number detector 85 compares the pattern numbers of the signals A and B with each other to detect the number of tracks crossed by the light spot. In the case of the signals A and B, the number of tracks crossed by the light spot will be one because two (the pattern number of signal B) minus one (the pattern number of signal A) equals to one.

As explained above, the binary pattern memory 90 is storing the reference patterns, so that, by comparing each received signal pattern with the reference patterns, the relative position and moved distance of the light spot (the optical pickup) can easily be found. By sequentially updating a signal held in the memory 84, the number of crossed tracks may continuously be detected. For example, if a signal C is detected at the next sampling time, the memory 84 provides the pattern number 2 of the presently holding signal B to the crossed tracks number detector 85, and newly holds the pattern number 3 of the signal C. Meantime, the crossed tracks number detector 85 finds one as the number of crossed tracks.

If the signal C is read after the signal A, the crossed tracks number detector 85 finds the number of crossed tracks of two. If the signal A is read after the signal B, the crossed tracks number detector 85 finds the number of crossed tracks of minus one, which means that the light spot has moved in a reverse direction.

In addition to the conventionally used on-track patterns Qa to Qp, the embodiment employs the intra-track patterns Qa-b to Qp-a. Accordingly, even if a combined pattern is detected due to the influence of adjacent tracks, the combined pattern does not cause a read error but provides information that the light spot is positioned between adjacent tracks on the optical disk.

For example, if a signal E-F having a pattern number of 5.5 is read after the signal A, the crossed tracks number detector 85 detects the number of crossed tracks of 4.5. Then, it is recognized that the light spot has crossed 4.5 tracks and is presently positioned between adjacent tracks. With this sort of decimal positioning, the relative speed of the light spot can be accurately measured from the number of revolutions of the optical disk and a moving state of the light spot, so that the optical pickup can be correctly controlled is accessing a target track.

The pattern number of the signal E-F may be "4" corresponding to the signal e, or "5" corresponding to the signal F. Namely, instead of employing the decimal positioning, any decimal position may be related to an integer pattern number of the adjacent track.

With this arrangement, intra-track information that may cause a read error on the conventional unit, may be effectively utilized to increase chances of obtaining information from the optical disk and realize quick and correct control.

During an accessing operation in which a light spot crosses a track in several sample periods, a probability of reading a combined binary signal of, for example, Qa-b between adjacent tracks of the access marks A and B may increase. In this case, the conventional optical disk unit irregularly provides the binary signals Qa and Qb.

According to the invention, however, the probability of irregularly outputting the binary signals Qa and Qb is greatly reduced. The invention can pick up the combined signal Qa-b, and treats the same as a signal which is irrelevant of a light spot movement. The invention obtains information related to the movement of the light spot only from the on-track signals, and never detects erroneously that the light spot is irregularly moving back and forth. This will be explained in detail.

The pattern number detector 83 judges whether a detected signal is an on-track signal or an intra-track signal, and, if the intra-track signal that differs by ±0.5 tracks from the previously read on-track signal is found, does not provide the intra-track signal to the memory 84 and crossed tracks number detector 85. Accordingly, the memory 84 and crossed tracks number detector 85 hold the previous on-track signal as it is. It is then recognized that the light spot is moving in the same direction as detected by the previous on-track signal.

It is possible that the binary signals Qa and Qa-b, or Qa-b and Qb are alternately read. In this case, the binary signal Qa-b is ignored in detecting the movement of the light spot, and it is recognized that the light spot is moving in the same direction as detected according to the preceding signal. If the preceding signal is Qa-b, a lastly obtained on-track signal determines the movement of the light spot. If a presently obtained on-track signal is the same as the preceding on-track signal, the crossed tracks number detector 85 calculates "0" from these signals to indicate that the light spot has crossed no track.

In this way, the embodiment stores the 16 on-track patterns Qa to Qp and the 16 intra-track patterns Qa-b to Qp-a having high probability of being encountered, and compares them with a detected pattern, thereby correctly detecting the number of tracks crossed by the light spot.

The numbers of crossed tracks obtained sequentially are accumulated by a track counter (not shown) to find the total number of crossed tracks during an accessing operation. The resultant total is always compared with the number of tracks to be crossed by the light spot to reach a target track that has been set at the start of the accessing operation, thereby finding the number of remaining tracks to be crossed to reach the target track.

The optical disk unit has a control system in which an ideal speed control pattern is programed, and controls the relative speed of the light spot (the optical pickup) in response to the number of the remaining tracks up to the target track. According to the control system, (1) a speed of the light spot measured from the sample period and the number of crossed tracks is always compared with (2) a reference speed based on the ideal speed control pattern, and the light spot (the optical pickup) is controlled to reduce the difference between the speeds (1) and (2).

Although the embodiment has employed the 16 kinds of on-track patterns, more or less kinds of patterns may be employed to achieve the similar control.

The embodiment can correctly control the movement of the light spot on the optical disk even when a combined binary signal is generated by adjacent tracks, so that the size of the light spot on the optical disk is not so critical. During an accessing operation, the light spot will be positioned very close to the next track if the size of the light spot is relatively large, to increase the possibility of detecting the combined binary signal. Even so, unlike the conventional optical disk unit, the embodiment which employs the intra-track signals will not erroneously control the motion of the light spot. This is the reason why the accuracy of the light spot on the optical disk is not so critical for the present invention. Even if the optical pickup has some focusing errors, the invention can stably control the optical pickup. The optical disk unit of the invention is easy to control during the accessing operation, and resistive to external vibration.

In summary, an optical disk unit according to the invention uses an optical disk having concentrical or spiral tracks on which many pits for sample servo control are formed. The pits form access marks for identifying individual tracks on the optical disk. A light spot is incidence upon the surface of the optical disk to detect the access marks to judge a motion of the light spot on the optical disk. If a combination of the access marks of adjacent tracks is detected, the optical disk unit judges that the light spot is positioned between the adjacent tracks, thereby improving the controllability of the light spot.

Various modifications will become possible for those skilled in the art after receiving the teachings of the present disclosure without departing from the scope thereof.

What is claimed is:

1. An optical disk unit for transmitting a light spot upon a surface of an optical disk provided with concentrical or spiral tracks on which a plurality of sample servo pits involving access marks specific for every predetermined number of tracks are formed, and detecting said access marks to recognize a moving state of said light spot on said optical disk, said optical disk unit comprising:

access mark pattern storage means for storing both access mark patterns corresponding to said access marks formed on said tracks and combined access mark patterns, said combined access mark patterns representing combinations of said access marks formed on adjacent tracks; and position detecting means for checking to see whether a detected access mark pattern matches one of said access mark patterns and said combined access mark patterns stored in said access mark pattern storage means, and for determining that said light spot is located between two adjacent tracks when a detected access mark pattern matches one of said combined access mark patterns stored in said access mark pattern storage means.

2. An optical disk unit as claimed in claim 1, further comprising:
movement detecting means for recognizing a moving state of the light spot according to plural pieces of information related to a position of the light spot on the optical disk obtained by said position detecting means.

3. An optical disk unit as claimed in claim 2, wherein said movement detecting means recognizes that the light beam is moving in the same direction as in the previous detection when a detected access mark pattern matches one of the combined access mark patterns.

4. The optical disk unit as claimed in claim 2, wherein the movement detecting means recognizes that the light spot is not moving when a first access mark pattern is detected from one of the tracks firstly, a combination of the first access mark pattern and a second access mark pattern that is of another track adjacent to the one track is detected between the adjacent tracks secondly, and the first access mark pattern is detected thirdly.

5. An optical disk unit as claimed in claim 1, wherein said position detecting means recognizes that the light spot exists between adjacent tracks when a detected access mark pattern matches one of the combined access mark patterns.

6. A method of determining movement characteristics of a light spot upon the surface of an optical disk having a plurality of tracks, said method comprising the steps of:
storing a predetermined number of unique access mark patterns in a memory;
dividing said plurality of tracks into groups, a number of tracks in said groups being equal to said predetermined number;
marking said optical disk on each track in each of said groups with an access mark corresponding to one of said unique access mark patterns;
additionally storing combination access mark patterns in said memory, each of said combination access mark patterns corresponding to a combined pattern of two of said access marks, said two of said access marks being marked on two adjacent tracks;
detecting a first access mark and storing a first detected access mark pattern representative of said first access mark;
checking whether said first detected access mark pattern matches one of said access mark patterns in said memory and checking whether said first detected access mark pattern matches one of said combination access mark patterns stored in said memory; and
determining a first relative position of said light spot when said checking step indicates a match of said first detected access mark pattern, wherein when said first detected access mark pattern matches one of said combination access mark patterns corresponding to said combined patterns of said two of said access marks, said light spot is located between said two adjacent tracks.

7. A method as recited in claim 6 comprising the further steps of:
detecting a second access mark and storing a second detected access mark pattern representative of said second access mark;
checking whether said second detected access mark pattern matches one of said access mark patterns in said memory and checking whether said second detected access mark pattern matches one of said combination access mark patterns stored in said memory;
determining a second relative position of said light spot when said checking step indicates a match of said second detected access mark pattern; and
calculating a velocity of positional change of said light spot using said first and said second relative positions of said light spot.

8. A method as recited in claim 7 comprising the further steps of:
detecting a third access mark and storing a third detected access mark pattern representative of said third access mark;
checking whether said third detected access mark pattern matches one of said access mark patterns in said memory and checking whether said third detected access mark pattern matches one of said combination access mark patterns stored in said memory; and
determining that said light spot is not moving when said first detected access mark pattern is equal to said third access mark pattern and said second access mark pattern matches a combination access mark pattern of said first access mark and an access mark of an adjacent track.

* * * * *